(12) United States Patent
Beck

(10) Patent No.: US 8,262,121 B2
(45) Date of Patent: Sep. 11, 2012

(54) LOW MOVEMENT TRAILER HITCH

(75) Inventor: Kent F. Beck, Layton, UT (US)

(73) Assignee: Frog Marketing, Inc., Salt Lake City, UT (US)

( * ) Notice: Subject to any disclaimer, the term of this patent is extended or adjusted under 35 U.S.C. 154(b) by 202 days.

(21) Appl. No.: 12/395,667

(22) Filed: Feb. 28, 2009

(65) Prior Publication Data

US 2009/0218789 A1    Sep. 3, 2009

Related U.S. Application Data

(60) Provisional application No. 61/033,291, filed on Mar. 3, 2008.

(51) Int. Cl.
*B60D 1/06* (2006.01)
(52) U.S. Cl. ........ 280/504; 280/506; 280/508; 280/511; 280/515; 280/491.2
(58) Field of Classification Search ................. 280/511, 280/515
See application file for complete search history.

(56) References Cited

U.S. PATENT DOCUMENTS

| | | | | |
|---|---|---|---|---|
| 3,954,286 | A * | 5/1976 | Weber | 280/512 |
| 5,333,888 | A * | 8/1994 | Ball | 280/504 |
| 5,344,175 | A | 9/1994 | Speer | |
| 5,685,686 | A * | 11/1997 | Burns | 414/462 |
| 6,010,143 | A | 1/2000 | Stein | |
| 6,105,989 | A | 8/2000 | Linger | |
| 6,131,938 | A | 10/2000 | Speer | |
| 6,357,780 | B1 | 3/2002 | Young | |
| 6,835,021 | B1 | 12/2004 | McMillan | |
| 6,974,147 | B1 | 12/2005 | Kolda | |
| 7,004,491 | B1 | 2/2006 | Allsop et al. | |
| 7,066,483 | B2 * | 6/2006 | Makos et al. | 280/507 |
| 7,077,417 | B2 | 7/2006 | Shoemaker | |
| 7,121,121 | B2 * | 10/2006 | Wyers | 70/14 |
| 2006/0208456 | A1 * | 9/2006 | Weaver | 280/491.5 |
| 2007/0252360 | A1 * | 11/2007 | Wooten | 280/511 |

* cited by examiner

*Primary Examiner* — Tony H. Winner
*Assistant Examiner* — Jacob Knutson
(74) *Attorney, Agent, or Firm* — Bateman IP

(57) ABSTRACT

A rigid trailer hitch is disclosed that uses pressure produced by a wedge into force against trailer hitch receiver walls, while still retaining a retaining pin as a backup. The wedge can be driven by rotary force translated through a compound miter or a split wedge across a retaining pin.

4 Claims, 7 Drawing Sheets

LOW MOVEMENT TRAILER HITCH

RELATED APPLICATIONS

Priority

This application claims priority to U.S. Provisional Patent Application No. 61/033,291, filed Mar. 3, 2008, which is incorporated herein by reference in its entirety.

FIELD

This application discloses devices for attaching an item to a vehicle. More specifically, the present application relates to trailer hitches configured to hold items to a vehicle.

BACKGROUND

Trailer hitches connect a vehicle to a load. Many common vehicles are configured for standard ball hitch applications, in which a ball is attached to the vehicle and a load is attached to a trailer coupler. The ball and coupler are able to freely pivot with respect to one another.

These towing vehicles are often configured to accept standard ball hitches through a trailer hitch receiver. The ball hitch and trailer hitch receiver contain a hole for a retaining pin. This retaining pin ensures that the trailer hitch remains within the trailer hitch receiver, such that the vehicle is redundantly connected to the load.

In some loads, such as a horse trailer, movement is desirable as movement between the ball and trailer coupler is necessary for the vehicle and trailer to adapt to changes in the road. Thus, movement between the ball hitch and trailer hitch is not of concern.

In other loads, such as an advertising sign or bike rack, movement between ports of the hitch is not desirable. It is desirable that a rigid load hitch engages a standard trailer hitch receiver with minimal, if any movement. It is also desirable to retain the retaining pin configuration.

SUMMARY

Embodiments of improved rigid trailer hitches and associated methods and implements are disclosed.

According to some embodiments, a wedge may be configured to move up a shank within a trailer hitch receiver such that movement of the trailer hitch within the trailer hitch receiver is significantly reduced while also retaining the ability to insert a retaining pin.

According to other embodiments, a split wedge may be configured to move along a retaining pin such that movement of the trailer hitch within the trailer hitch receiver is significantly reduced while also retaining the ability to contain a retaining pin.

These and other embodiments of a trailer hitch are disclosed herein in a movement reducing trailer hitch as shown and described in the following figures and related description. It will be appreciated that the description and figures are only exemplary of the invention and are not intended to narrow the appended claims.

BRIEF DESCRIPTION OF THE DRAWINGS

Various embodiments of a trailer hitch are shown and described in reference to the numbered drawings wherein.

It will be appreciated that the drawings are illustrative and not limiting of the scope of invention which is defined by the appended claims. The embodiments shown accomplish various aspects and objects of the invention. It is appreciated that it may not be possible to clearly show each element and aspect of the invention in a single FIGURE, and as such, multiple figures are presented to separately illustrate the various details of exemplary embodiments in greater clarity. Similarly, not every embodiment need accomplish all advantages of the present invention.

DETAILED DESCRIPTION

Embodiments of a rigid trailer hitch assembly and accompanying drawings are discussed in reference to the numerals provided therein so as to enable one skilled in the art to practice the present invention. The drawings and descriptions are exemplary embodiments of various aspects of a rigid trailer hitch assembly and are not intended to narrow the scope of the appended claims.

Figure 1:
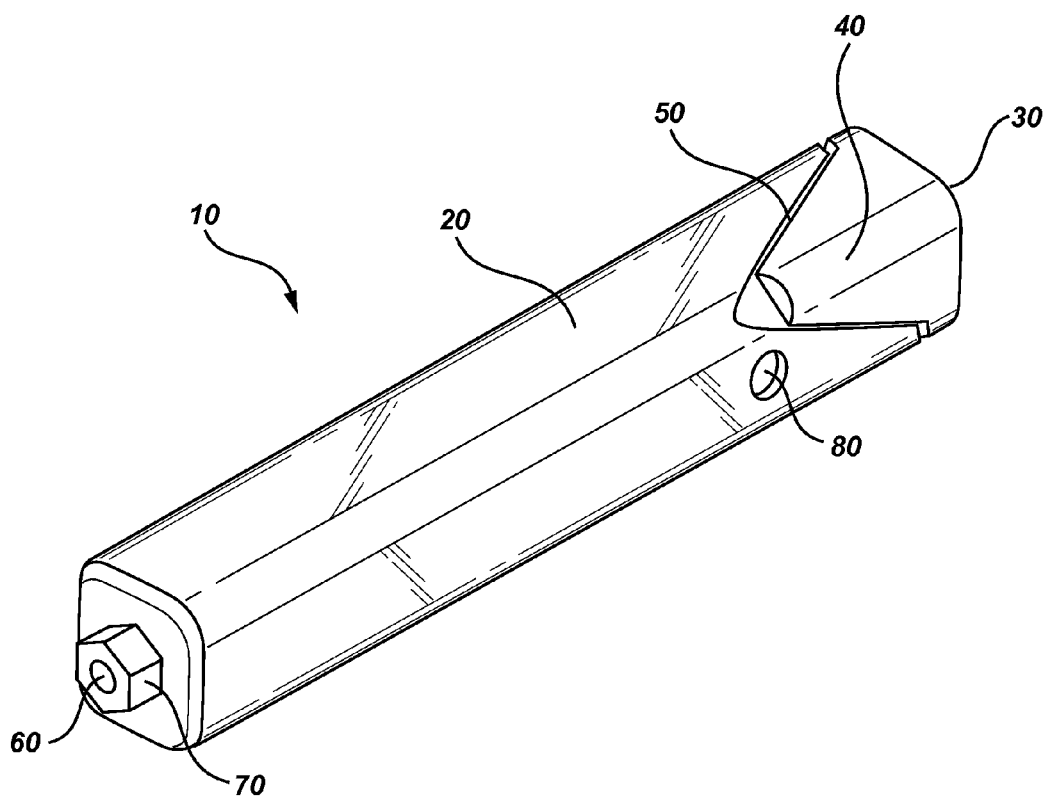
FIG. 1 shows a perspective view of an assembled rigid trailer hitch in accordance with the principles of the present invention.

Turning now to FIG. 1, a perspective view is provided of a rigid trailer hitch attachment, generally indicated at 10. The trailer hitch attachment 10 includes a shank 20 and an attachment member 30 which may engage the shank 20 to improve holding of the shank 20 within a trailer hitch receiver 304 (FIGS. 4-7). The attachment member 30 includes a wedge 40 which may slide relative to the shank, such as, for example on a compound miter 50 of the shank 20. (A compound miter 50 is preferred to provide improved holding both vertically and horizontally, although an improvement can be achieved with a configuration which works in only one direction).

A rod 60 extends through the shank 20 and may engage the attachment member 30 in a threaded engagement as will be explained below. A rod head 70 may be attached to the end of the rod 60. When the rod head 70 is rotated in one direction, a threaded end 130 (FIGS. 2-5) of the rod 60 may engage the attachment member 30 and generate a force that causes the attachment member main body 120 (FIGS. 2-3) to move further within the shank 20, i.e. toward the rod head. This movement may also cause the wedge 40 to slide further up the compound miter 50 of the shank 20. As the wedge 40 slides further up the compound miter 50, a force is exerted perpendicular to the longitudinal axis of the shank 20. When the rigid trailer hitch attachment 10 is within a trailer hitch receiver 304 (FIGS. 4-7), this force may engage the walls 300 of the trailer hitch receiver 304 and cause the rigid trailer hitch attachment 10 to remain substantially rigidly in place. This rigidity is in sharp contrast to where a shank of the prior art is inserted into the trailer hitch receiver 304 and differences between the outside dimensions of the shank and the inside dimensions of the trailer hitch allow movement between the two which is amplified by any item attached to the shank.

When the attachment member 30 is placed within the shank 20, a retaining pin slot 80 is able to accept a retaining pin 410 (FIGS. 4-7). When properly placed, the retaining pin slot 80 lines up with a corresponding slot 380 (FIG. 7) in the trailer hitch receiver 304 such that a retaining pin 410 travels through the trailer hitch receiver 304, shank 20 and attachment member 30. Should the rigid trailer hitch's 10 friction be insufficient to hold the rigid trailer hitch 10 within the trailer hitch receiver 304, the retaining pin 410 provides sufficient force to keep the rigid trailer hitch attachment 10 within the trailer hitch receiver 304. Utilizing the retaining pin 410 ensures that the rigid trailer hitch attachment 10 and its attachments are not suddenly dropped from the trailer hitch receiver 304 behind a vehicle.

Figure 2:
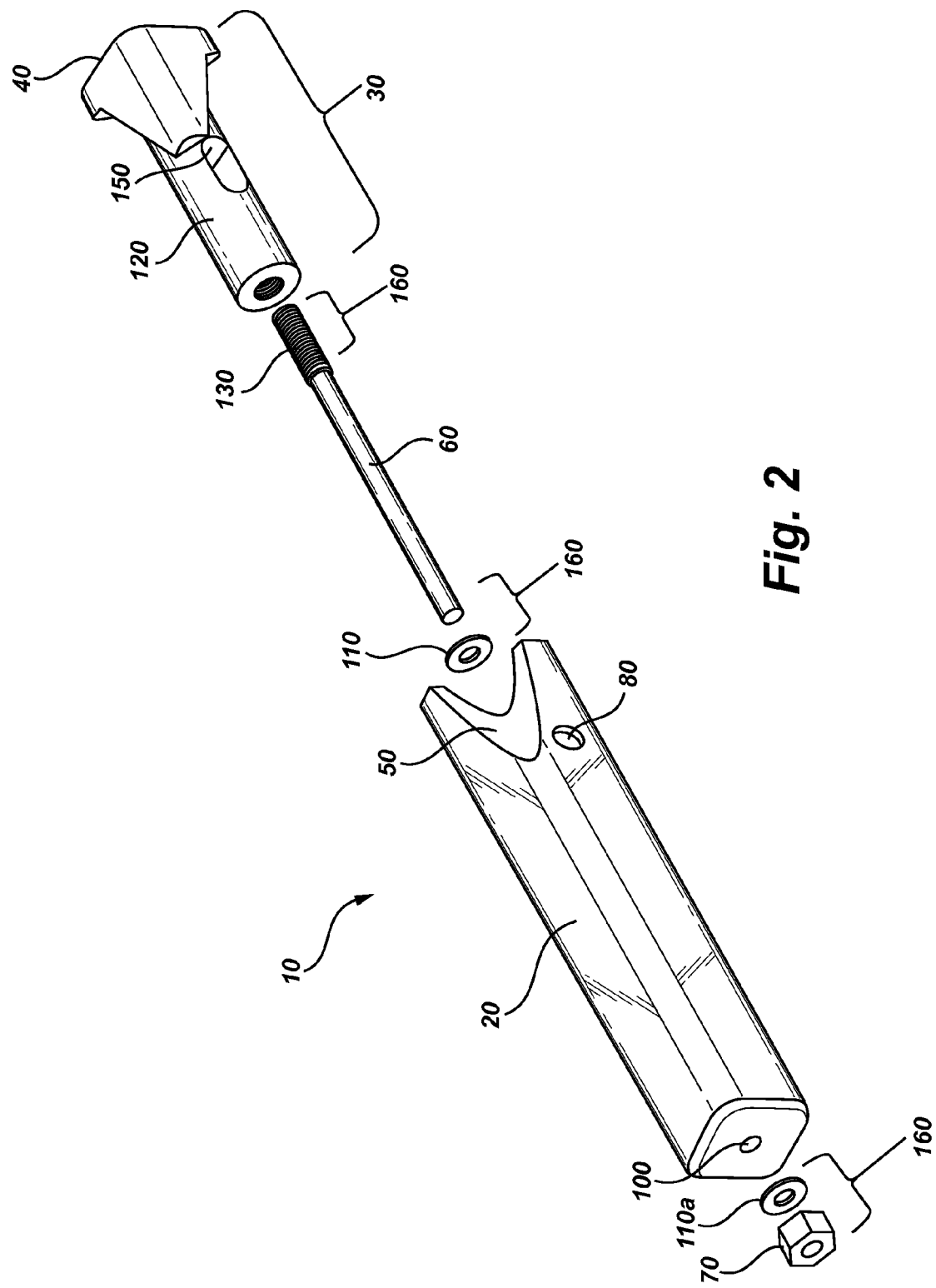
FIG. 2 shows an exploded view of the rigid trailer hitch as seen in FIG. 1.

Turning now to FIG. 2, there is shown an exploded view of the rigid trailer hitch attachment 10 seen in FIG. 1. The shank 20 may contain a longitudinal hole 100 and the rod 60 may be placed in the longitudinal hole 100. The rod 60 may be held in place by a rod retainer 160 having a rod head 70 of a larger diameter than the longitudinal hole 100 and a central abutment having a washer 110*a* attached to the rod 60. The washer 110*a* can be welded or otherwise attached to or formed with the rod 60, and the rod head 70 may be attached to the rod 60 by welding or some other attachment mechanism. The fixed nature of the rod could also be reversed.

The attached washer 110*a* may form a flange of a larger diameter than the longitudinal hole 100 and prevent the rod 60 from advancing longitudinally out of the hole 100 toward the rod head 70. Likewise, the rod head 70 may prevent longitudinal movement of the rod 60 in the opposite direction. Another washer 110 may be used between the rod head 70 and the shank 20 to facilitate rotation of the rod 60.

The rod 60 may connect to the attachment member body 120. This connection can be accomplished through a threaded end 130 to the rod 60 and a threaded hole 140 within the attachment member body 120. A rotational motion of the rod 60 may cause the attachment member 30 to engage or release the rod 60 according to the rotation direction and threading of the threaded end 130 and threaded hole 140 combination.

The attachment member body 120 may contain a body slot 150 configured to work in conjunction with the retaining pin slot 80 in the shank 20. The body slot 150 may be configured to be larger than the retaining pin 410 (FIGS. 4-7) such that adjustments that cause movement of the attachment member 30 may not interfere with the ability of the retaining pin 410 to pass through the attachment member body 120.

Various embodiments of the assembly of rigid trailer hitch attachment 10 components can be dependent upon use. For example, in light usage, such as sign or bike carrier attachments, a plastic, resin, aluminum, or light weight or low-cost material may be sufficient for some or all of the components, while reducing overall weight as compared with steel. For heavier loads, steel or other materials of a similar strength may be desired.

Figure 3:
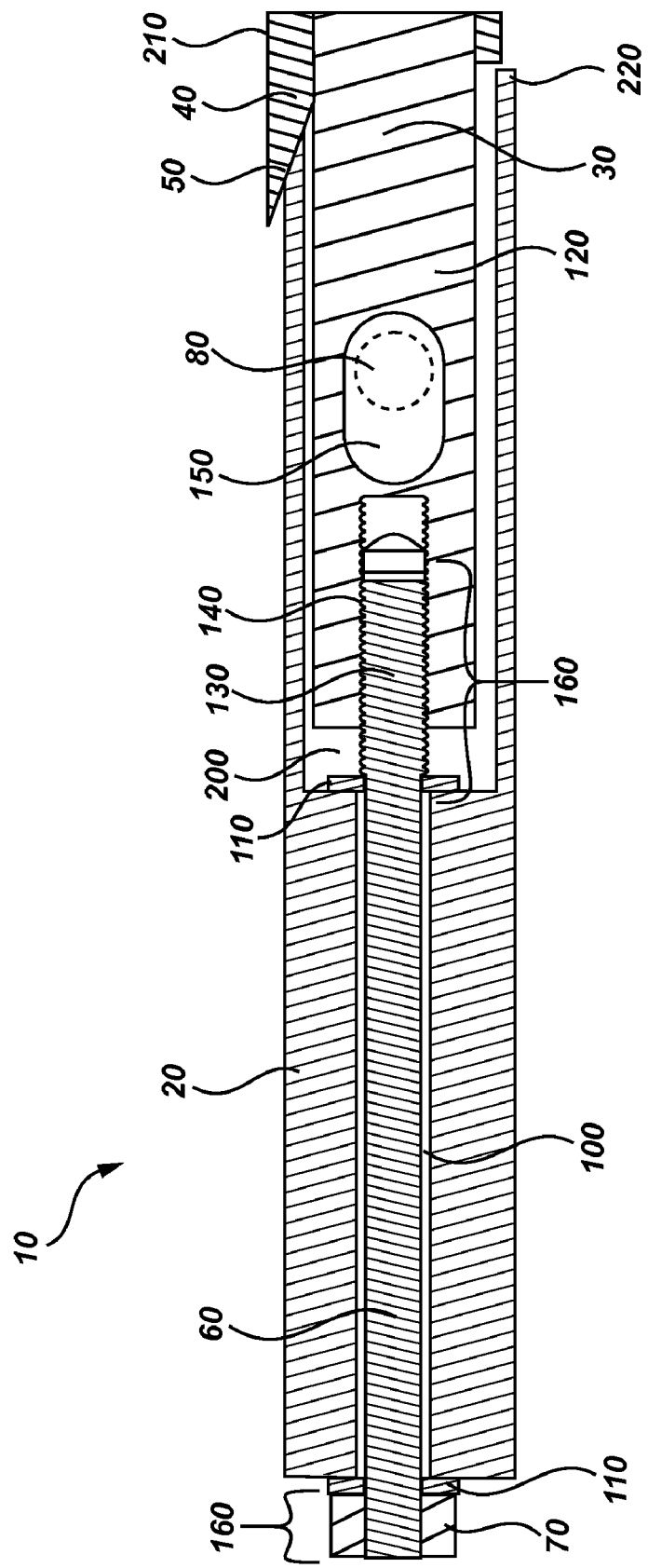
FIG. 3 shows a cross-section of FIG. 1 perpendicular to the shank's retaining pin slot.

Turning to FIG. 3, a cross-section of FIG. 1 perpendicular to the retaining pin slot 80 of the shank 20, the inner working parts of the rigid trailer hitch 10 are shown. The attachment member body 120 may slide into a shank cavity 200 within the shank 20. Movement of the attachment member 30 may be limited to the plane of compound miter 50 of the wedge 40 by contact between the attachments member 30 and the wedge 40. Rotating the rod 60 such that more of the threaded end 130 is engaged within the attachment member body 30 causes the wedge 40 to travel up the compound miter 50. This travel may increase the effective distance between the top 210 of the wedge 40 and the opposite corner 200 of the shank 20.

The rod retainer 160 of the rigid trailer hitch attachment 10 may reduce or prevent lateral movement of the rod 60. The members of the rod retainer 160 are best illustrated in FIG. 3. The rod retainer 160 generally includes the washers 110, the rod head 70, and the threaded end 130. In the illustrated embodiment, rod 60 is contained within the longitudinal hole 100 by a set of washers 110. The washers 110 have an outside diameter larger than the longitudinal hole 100 and an inner hole diameter that is less than that of the rod head 70 and the threaded end 130. Such embodiments of rod retainers 160 may minimize longitudinal movement of the rod 60 within the longitudinal hole 100. Rotating the rod head 70 in the opposite direction may affirmatively disengage wedge 40 and opposing corner 220.

Figure 4:
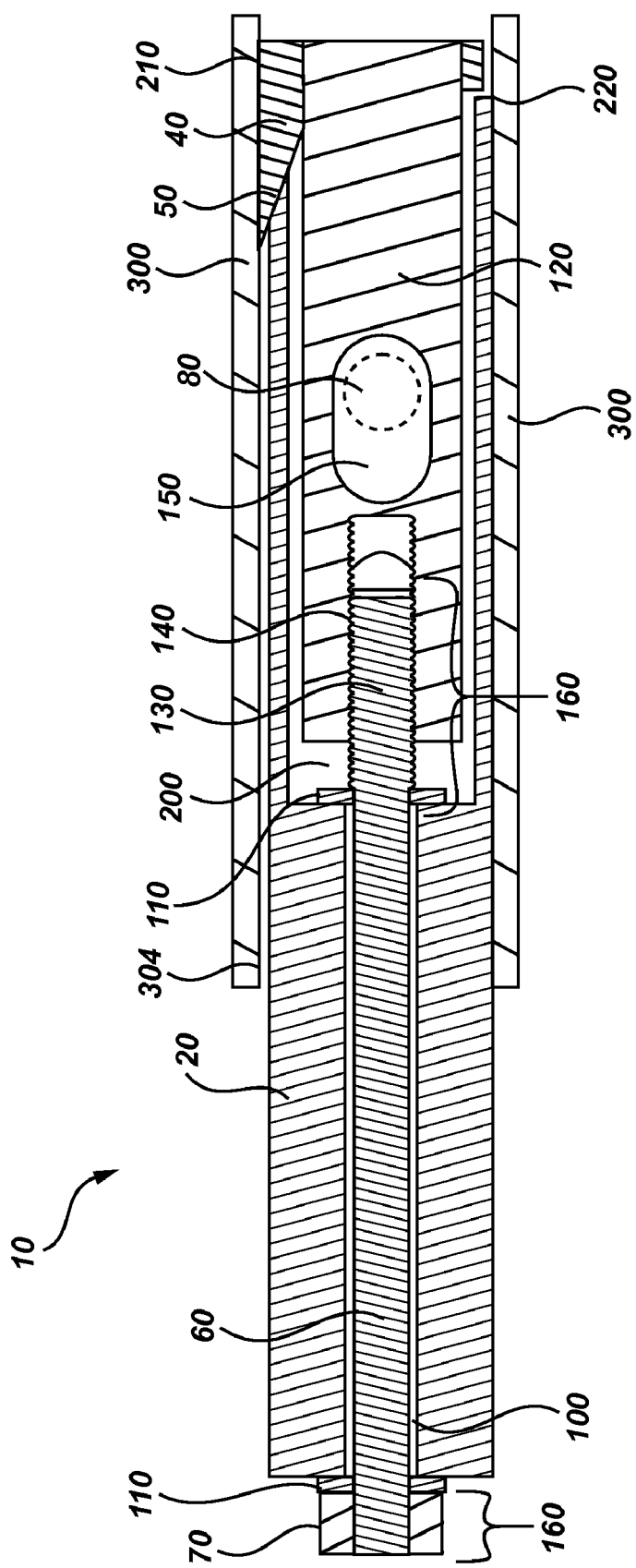
FIG. 4 shows a cross section of the rigid trailer hitch in FIG. 3 contained within a trailer hitch receiver.

Turning to FIG. 4, a cross-sectional view of the rigid trailer hitch 10 of FIG. 3 is shown contained within a trailer hitch receiver 304. The trailer hitch receiver walls 300 provide a surface for an upper surface 210 of the wedge 40 to engage with, and an opposing rigid surface for the a lower surface 220 of the shank 20 to engage with. As the head 70 of the rod 60 is twisted one way, the threaded end 130 of the rod 60 may engage the attachment member body 120 and pull the attachment member body 120 further within the shank 20. As the attachment member body 120 is pulled further within the shank 20, the wedge 40 may then slide up the compound miter 50. As the wedge 40 slides up the compound miter 50, the wedge 40 may then push against the upper surface 210 of the trailer hitch receiver walls 300, causing firm engagement of shank 20 within trailer hitch receiver 304. The corresponding return force of the upper surface 210 may then cause the shank 20 to engage the lower surface 220. The engagement of the wedge 40 and the shank 20 against the trailer hitch receiver walls 300 may provide rigidity to the rigid trailer hitch 10. Correspondingly, if the head 70 of the rod 60 is twisted in the opposite direction, the rigid trailer hitch 10 may then disengage from the trailer hitch receiver walls 300.

Figure 5:
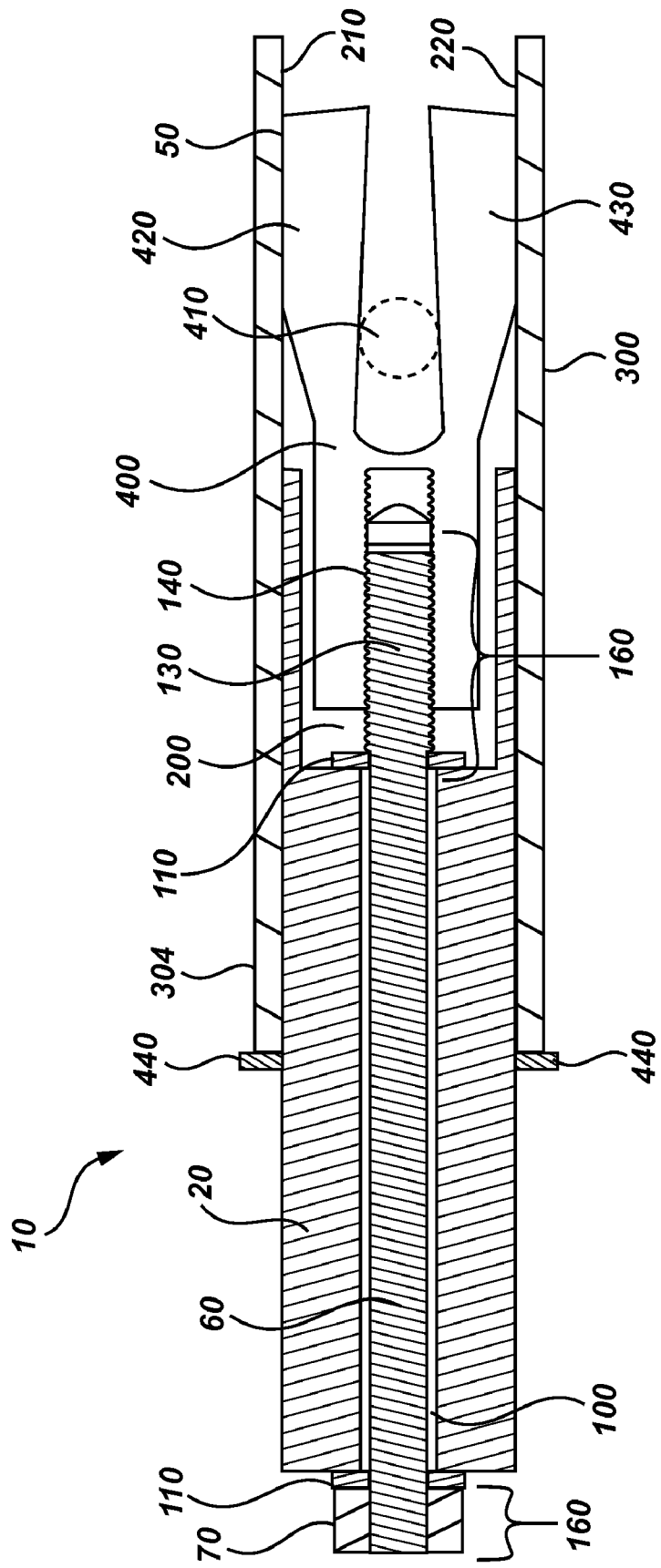
FIG. 5 shows a cross section of a rigid trailer hitch with a split wedge.

Turning to FIG. 5, a cross section of a rigid trailer hitch 10 with an attachment member in the form of a split wedge body 400 is shown within trailer hitch receiver walls 300. The rigid trailer hitch 10 is shown inserted within the trailer hitch receiver walls 300. A retaining pin 410 may be inserted in between the upper wedge 420 and the lower wedge 430. The head 70 of the rod 60 may then be turned to causes the thread end 130 of the rod to engage the split wedge body 400 and draw the split wedge body 400 toward the shank 20. As the split wedge body 400 is drawn toward the shank 20, the retaining pin 410 may then cause the upper wedge 420 and the lower wedge 430 to deform outwards and press against the trailer hitch receiver walls 300. As the upper wedge 420 and lower wedge 430 engage the trailer hitch receiver walls 300, the combined force of the upper wedge 420, lower wedge 430, and the retaining pin 410 may contribute to the rigidity of the rigid trailer hitch 10.

The shank 20 can be held stationary by a flange 440 on the shank 20 in front of the trailer hitch receiver walls 300. Reduced movement of the shank 20, in comparison with the split wedge body 400 may aid the retaining pin 410 in separating the upper wedge 420 and the lower wedge 430. Splitting the upper wedge 420 and lower wedge 430 may thus result in producing the necessary force against the trailer hitch receiver walls 300 to hold the shank 20 firmly within trailer hitch receiver 304.

While FIG. 5 shows the retaining pin 410 not passing through the shank, it will be appreciated that the angle of the engagement between the retaining pin and the upper wedge 420 and lower wedge 430 may be such that it would allow the shank to extend past and receive the retaining pin. In such embodiments, the attachment member that forms the split wedge body 400 cannot be pulled out of the receiver 304 because the thickness of the upper wedge 420 and lower wedge 430 are greater than the distance between the retaining pin 410 and the trailer hitch receiver walls 300.

Either of the embodiments shown herein may provide a marked improvement in the rigidity of anything attached to the shank 20. The trailer hitches 10 disclosed in this application have almost no play between the shank 20 and the trailer hitch receiver 304, unlike a conventional shank of a conventional trailer hitch. Thus, rather than having a trailer, bike rack, sign, or other load to the shank 20 swaying back and forth on the back of a vehicle, the shank 20 may be held substantially rigid, with substantially little or no lateral movement of whatever is attached to the shank, relative to the vehicle.

Figure 6A:
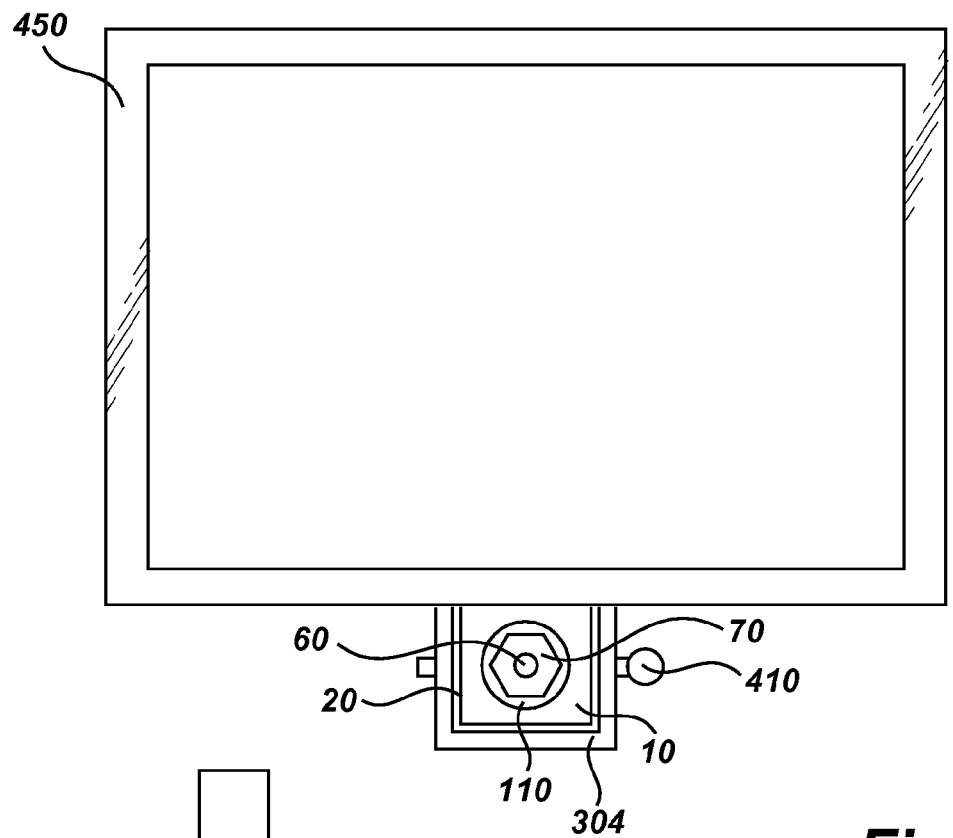
FIG. 6A shows an end view of a trailer hitch mounted in a hitch receiver with a load attached thereto.
Figure 6B:
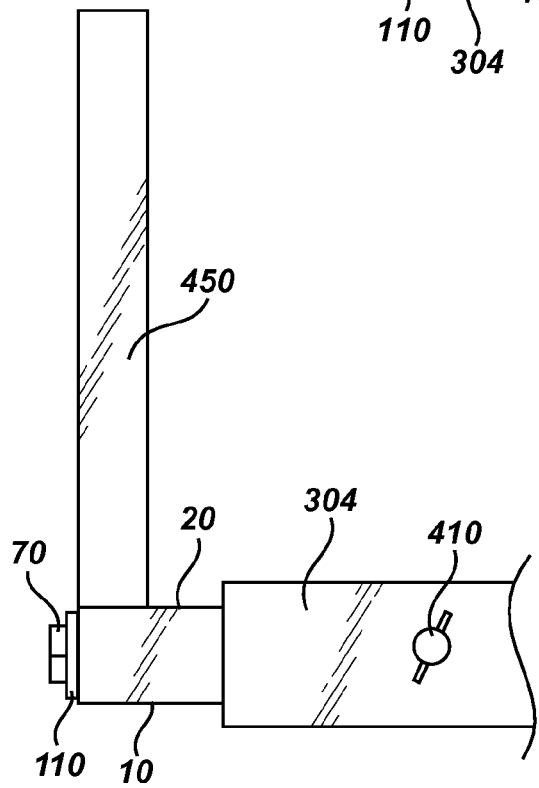
FIG. 6B shows a side view of the trailer hitch and load of FIG. 6A.

Turning now to FIGS. 6 and 6A, there is shown an end view and a side view of the trailer hitch 10 (or 10') mounted in the hitch receiver 304. In some embodiments, the trailer hitch 10 may be held in place by turning the rod head 70 to rotate the rod 60 and engage the wedge 40 of wedges 420, 430 as discussed above. While conventional trailer hitches will pivot side to side due to the tolerances necessary to insert the hitch into the receiver, embodiments of the trailer hitch 10 may hold the shank 20 firmly, substantially eliminating side-to-side movement of a load 450 attached to a vehicle through the shank 20. Those skilled in the art will appreciate that the load 450 may be an advertising sign, a bike rack, a trailer, or any other item attachable to the shank 20 and for which pivoting back and forth is undesirable. With the pin 410 installed, the trailer hitch 10 or 10' disclosed within this application has all the retaining ability of a conventional trailer hitch, but may provide a substantial improvement in holding the load 450 stable.

Additionally, the rod head 70 may allow for easy attachment and removal of the trailer hitch 10. Once mounted in the trailer hitch receiver 304, the rod head 70 need only be rotated in one direction to secure the shank 20 within the hitch receiver 304. While the wedging action of the trailer hitch 10 in the receiver 304 may ordinarily make removal of the trailer hitch 10 difficult, rotating the rod head 70 in the opposite direction forces the wedges away from the rod head 70 and makes the trailer hitch 10 easy to remove.

Figure 7:
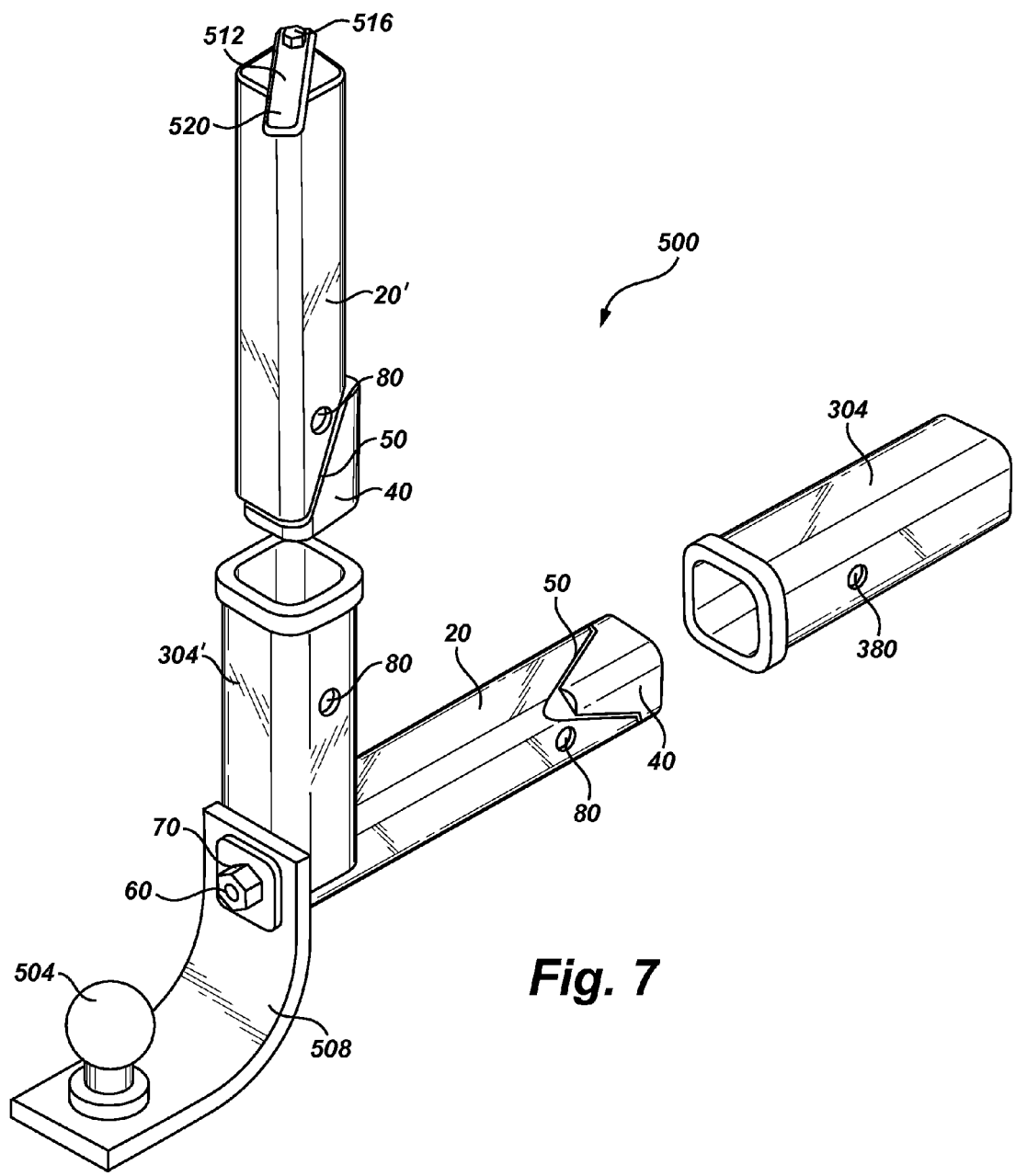
FIG. 7 shows a multifunction trailer hitch made in accordance with principles of the present invention.

Turning now to FIG. 7, there is shown a perspective, partially exploded view of an embodiment of a multifunction trailer hitch 500. The multifunction trailer hitch 500 may include several aspects of embodiments of the trailer hitch 10 described above, as well as additional aspects that will be described below. It will be appreciated that these aspects can be incorporated into any of the embodiments discussed above. For example, the embodiments above are discussed primarily in the context that tightening the rod head 70 and rod 60 will draw the wedge 40 along the compound miter 50 and thereby hold the shank 20 tightly in the trailer hitch receiver 304 to prevent lateral pivoting of a load 450 carried by the shank 20 or the two wedge system discussed in FIG. 5. As shown in FIG. 7, however, the shank 20 may be attached to a ball 504 for towing a trailer, or other device using a ball attachment. The ball 504 may be mounted directly on the shank 20 or may be attached by an intervening structure, such as arm 508. The arm 508 may be directly attached, i.e. formed integrally therewith or welded (etc.) to the shank 20, or may be removably attached.

When towing a trailer, pivoting of the shank 20 from side to side may not generally be a great concern from the point of view of the load, because the ball 504 may allow for some movement as well. However, in accordance with some embodiments, using the shank 20 and receiver 304 is advantageous because it may substantially reduce noise, and may reduce trailer sway in some circumstances. Traditional shanks tend to vibrate and rattle within the receiver, while, as discussed above, the shank 20 may be held firmly within the receiver 304 by tightening the rod 60. The secure engagement of the shank 20 may substantially reduce movement between the shank and the receiver 304, thereby reducing rattling as the vehicle travels along a road.

Another aspect of embodiments illustrated in FIG. 7 includes a second receiver 304', which may be attached to the shank 20, thereby acting as a load similar to 450 in FIGS. 6 and 6A. This may allow for a second shank 20' to be mounted into the receiver 304', thus providing a multifunction trailer hitch 500. If, for example, in the event that a person wished to tow a trailer behind their vehicle and to also have a bike rack or sign carried by the trailer hitch as well, the multifunction hitch 500 may allow both to be accomplished. The ball 504 may be used to tow the trailer, while the engagement between the second receiver 304' and the second shank 20' can be used to attach the bicycle rack, sign, etc. If the bicycle rack or sign is no longer needed, the second shank 20' can be removed without removing or otherwise affecting the trailer engaging the ball 504. Likewise, two different bike racks, signs, etc. could be mounted with one being removable independent of the other. One could be mounted directly to shank 20, while the other is attached to shank 20' which may be longer to provide spacing between the two loads.

For the sake of brevity, only one second receiver 304' and second shank 20' are shown. It will be appreciated, however, that some embodiments may include multiple secondary shanks and receivers, and could be used to enable multiple different loads (or a load which is better served by multiple attachment points) to be carried by the multifunction trailer hitch 500. Embodiments of multifunction trailer hitch 500 may also allow such loads to be carried securely and with less movement and rattling than conventional hitches. Such embodiments may also allow several loads to be added or removed independently of each other. Further, it will be appreciated that other embodiments may use the invention as an extender with a second receiver 304' in line with the receiver 304 rather than at a right angle as shown in FIG. 7.

FIG. 7 also illustrates the holes 80 in the shanks 20, 20' and the holes 380 in the receivers 304, 304', which form a slot for a pin 410. The retaining pin 410 (FIG. 6) may extend through each shank and its respective receiver to ensure retention even if the shanks were otherwise not securely mounted.

Some embodiments may include a quick release 512. Rather than using a rod head 70 on the rod 60, the second shank 20' shows the use of a quick release 512. The quick release 512 may include a cam 516 and an arm 520 extending from the cam 516. Rather than rotating the rod head 70, the quick release 512 can be used to rotate the rod 60 (FIGS. 1-6) until the wedge 40 is moved sufficiently up the compound miter 50 that it starts to secure the shank 20' in the hitch receiver 304'. The arm 520 is then used to rotate the cam 516 which pulls the rod 60 and other structures (see discussion in FIGS. 1-6 above) outwardly to move the wedge 40 (FIGS. 1-4) or wedges (FIG. 5) toward the quick release 512 and into secure engagement between with the inside wall 300 of the receiver 304'. Those of skill in the art will be familiar with such cam mechanisms, such as those used on many bicycle hubs to hold the wheel to the forks. While only shown on the second shank 20', it will be appreciated that both shanks could have the quick release 512 to facilitate more rapid and toolless attachment and removal of the shanks 20' from the receivers 304'.

There is thus disclosed embodiments of an improved rigid trailer hitch 10, 500. It will be appreciated that the elements shown in one drawing could be used in conjunction with the other drawings, and illustrate exemplary embodiments. For example, the quick release 512, the attachment mechanism for a ball, and/or the two shank system shown in FIG. 7 could be used with any of the other embodiments. Likewise, the internal structures or load attachment mechanisms discussed in FIGS. 1-6 could be used in conjunction with the general concept shown in FIG. 7. Other combinations of features discussed herein may also be provided without departing from the scope of the claims.

Likewise, it will be appreciated that numerous changes may be made to the present invention without departing from the scope of the claims. The appended claims are intended to cover such modifications.

What is claimed is:

1. A trailer hitch, comprising:
    a shank including a first end, a central longitudinal hole, and a transverse slot, the slot being configured to accept a retaining pin;
    an attachment member including a split wedge comprising a body, the body having a first end and a second end, the first end being configured to be inserted within the first end of the shank, and the second end comprising first and second wedge segments; and
    a rod configured to be placed within the central longitudinal hole of the shank and connect with the attachment member such that lateral movement induced by rotation of the rod is transferred to the attachment member;
    wherein the trailer hitch is receivable in a hitch receiver such that the retaining pin may be inserted through the hitch receiver and the transverse slot of the shank and between the first and second wedge segments; and
    wherein lateral movement of the attachment member within the trailer hitch receiver causes both the first and second wedge segments to engage the retaining pin, and wherein engagement of the retaining pin with the first and second wedge segments causes deformation of the split wedge such that lateral movement of the attachment member is substantially limited by friction between the split wedge and the trailer hitch receiver.

2. The trailer hitch of claim 1, wherein the rod is connected to the attachment member with a threaded engagement.

3. The trailer hitch of claim 1, further comprising a rod retainer on the rod, wherein the rod retainer includes a head section and a central abutment, the head section forming a flange having a diameter larger than the diameter of the central longitudinal hole, the central abutment fixedly attached to the rod and having a flange with a diameter larger than the diameter of the central longitudinal hole.

4. The trailer hitch of claim 3, wherein the rod retainer includes at least one washer attached to the rod.

* * * * *